Dec. 20, 1949     G. F. CALDWELL     2,491,891
SUPPORT

Filed March 8, 1946     2 Sheets-Sheet 1

INVENTOR.
GEORGE F. CALDWELL
BY
Ralph T. French
ATTORNEY.

Dec. 20, 1949  G. F. CALDWELL  2,491,891
SUPPORT

Filed March 8, 1946  2 Sheets-Sheet 2

INVENTOR.
GEORGE F. CALDWELL
BY
ATTORNEY.

Patented Dec. 20, 1949

2,491,891

UNITED STATES PATENT OFFICE 2,491,891

SUPPORT

George F. Caldwell, Philadelphia, Pa.

Application March 8, 1946, Serial No. 652,885

1 Claim. (Cl. 248—346)

This invention relates to supports, more particularly to supports for the funnel elements of coffee brewers, and has for an object to provide improved supports of this character.

In the use of coffee brewers consisting of a lower decanter element and an upper funnel element, and the funnel element comprising a bowl having a tubular stem depending therefrom for insertion into the decanter and adapted to be sealed with respect to the latter by a gasket forming part of the funnel, considerable breakage of the funnel element occurs.

Such breakage usually results from rolling of the funnel when separated from the decanter and lying on a flat surface such as a sink drainboard or table top. Such rolling may cause the funnel, which generally is made of relatively thin glass, to strike an adjacent object or to fall from the supporting surface to the floor, either action usually resulting in cracking, chipping or breaking of the funnel.

Further, the mere contact of the funnel with a hard supporting surface, such as a sink drainboard, may cause cracking or breaking if special care is not exercised in laying the funnel thereon.

Accordingly, another object of the invention is to provide means for preventing rolling of a coffee brewing funnel when laid on a flat supporting surface.

A further object of the invention is to provide means for preventing direct contact between a coffee brewing funnel and a flat surface supporting the same.

Another object of the invention is to provide, for use with a coffee brewing funnel, a supporting member which may be readily applied to, and removed from, said funnel.

Yet another object of the invention is to provide, for use with a coffee brewing funnel, a supporting member therefor which will prevent rolling thereof when the funnel is positioned horizontally on a supporting surface, and which may remain associated with the funnel during normal use thereof.

A further object of the invention is to provide a supporting member for a coffee brewing funnel which may remain secured to said funnel during use of the latter, or may be readily removed therefrom if desired.

These and other objects are effected by the invention as will be apparent from the following description and claim taken in accordance with the accompanying drawings, forming a part of this application, in which:

Figure 5:
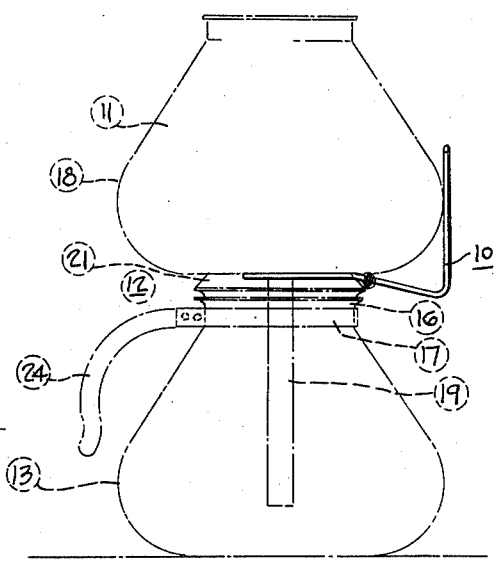
Fig. 5 is a side elevational view showing the device applied to the coffee brewing funnel during normal use of the latter.

Referring now to the drawings more in detail, the reference character 10 indicates, in its entirety, the novel support constituting the subject matter of the present invention, shown in Figs. 1, 2, 3 and 5 applied to the object to be supported, the funnel 11 of a coffee brewer 12 (Fig. 5).

Throughout the drawings the coffee brewer 12 and its component parts are shown in phantom, the brewer 12 comprising a decanter 13 having the usual handle 14 attached to the neck 16 thereof by the band 17. The funnel 11 includes the bowl 18 and depending stem 19, the latter being adapted to extend into the decanter 13 when the funnel 11 is positioned thereon and sealed relative thereto by the gasket 21. Usually, the gasket 21 is of a rubberlike material and the remaining parts are of glass.

Referring now to the form of the invention shown in Figs. 1 to 4, inclusive, the support 10 is preferably formed of a single piece of wire provided at its midpoint with a bend 23 connecting a pair of diverging first portions 24. These portions 24 are joined by bends 25 to a pair of converging second portions 26. The portions 24 and 26 and the connecting bends 23 and 25 all lie in a common plane and define a base adapted to rest on any suitable supporting surface such as a sink drainboard, table top, etc.

A pair of leg portions 27 extend upwardly from, and are connected to, the free ends of the portions 26, and terminate in a pair of spaced arms or gripping members 28 which are oppositely concaved to closely embrace the funnel 11 at opposite sides of the groove 29 defined by the bottom of the funnel bowl 18 and the adjacent inclined surface 31 of the gasket 21. To insure that the arms 28 engage the groove 29 with sufficient pressure to prevent accidental separation of the support 10 from the funnel 11, a coiled spring 32 connects the two arms 28 at their point of connection with the legs 27, and is of such length that it is tensioned when the arms 28 are in normal engagement with the funnel groove 29.

Preferably the legs 27 are inclined slightly from the perpendicular relative to the plane of the base portions 23, 24, 25 and 26, in the direction of the bend 23, and the arms 28 may be slightly inclined in the same direction. As result of this inclination, the base is at all times urged into contact with the side of the funnel bowl 18.

As shown in Fig. 5, the support 10 does not interfere with normal assembly of the funnel in the decanter 13, and may remain conveniently attached to the funnel at all times, if desired, or may be easily removed when the funnel is to be washed. If kept on the funnel during normal use of the latter, it is immediately ready and permits laying down of the funnel as soon as removed from the decanter.

Figure 1:
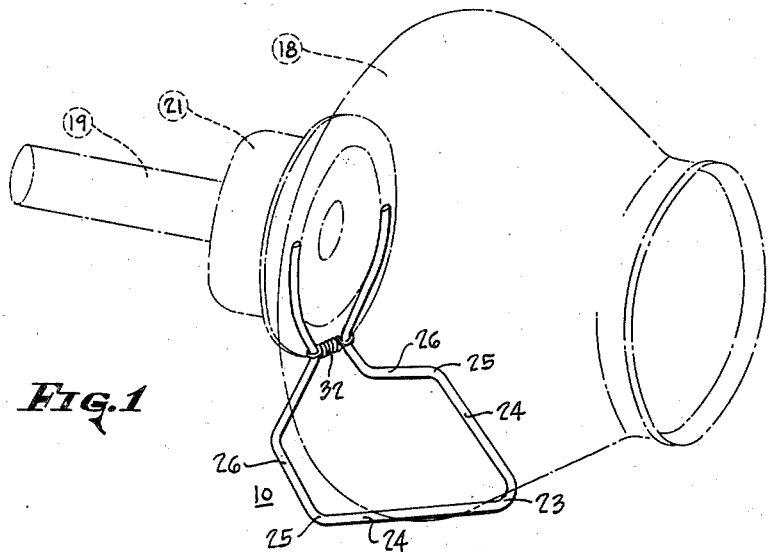
Fig. 1 is a perspective view of one form of the present invention.
Figure 2:
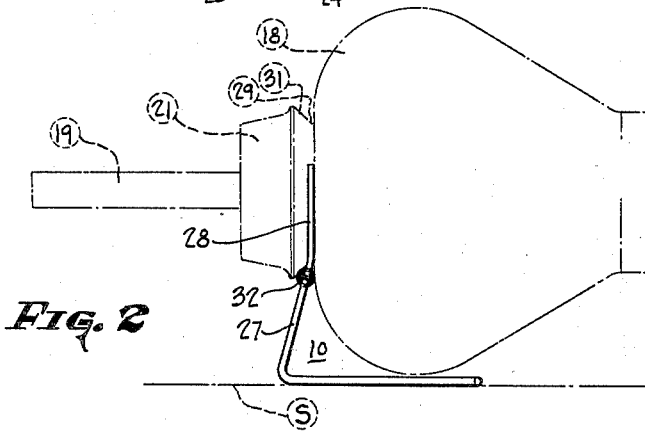
Fig. 2 is a side elevational view of the structure shown in Fig. 1.
Figure 3:
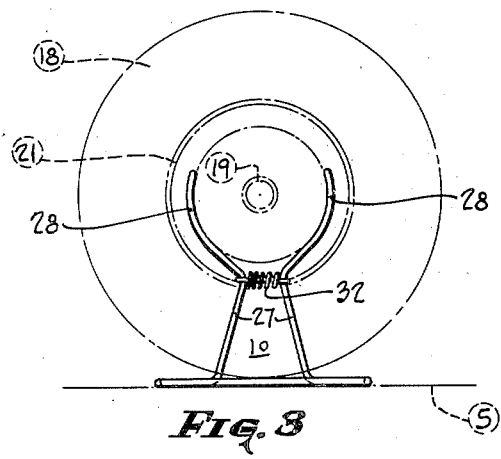
Fig. 3 is an end elevational view of the structure shown in Figs. 1 and 2, as viewed from the left of the latter figure.
Figure 4:
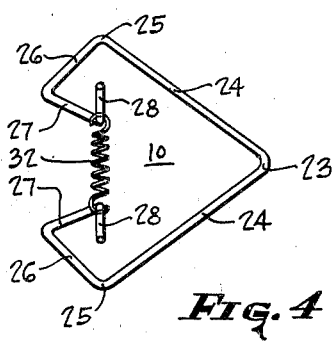
Fig. 4 is a plan view of the structure of the preceding figures.

As best shown in Figs. 2 and 3, the base of the support 10 is so shaped and dimensioned as to support the bowl 18 in spaced relation to the supporting surface S, whereby the base of the support serves as a somewhat resilient cushion between the bowl 18 and the supporting surface S.

It will be apparent to those skilled in the art that if it is desired to avoid the expense of using the spring 32, the same function may be obtained from the natural resiliency of the wire from which the support is formed, either in the shape shown, or by a crossing or twisting of the legs 27 and arms 28 in the region of their junction.

Figure 6:
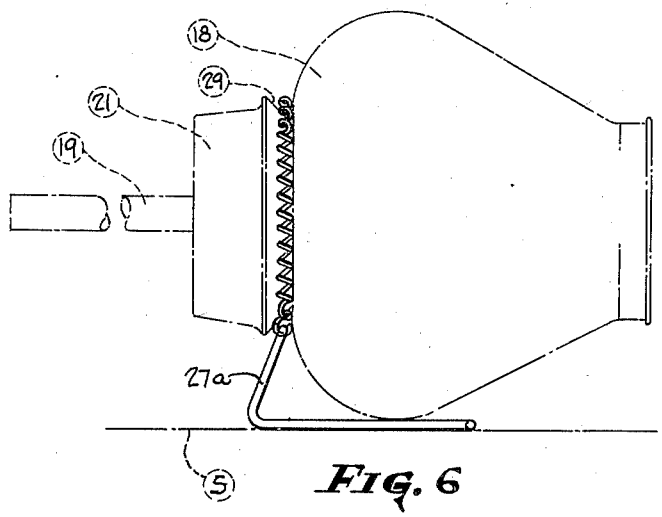
Fig. 6 is a side elevational view of a modified form of the invention.
Figure 7:
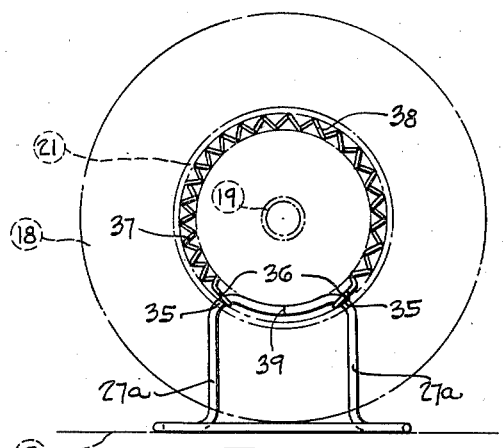
Fig. 7 is an end elevational view of the structure shown in Fig. 6.
Figure 8:
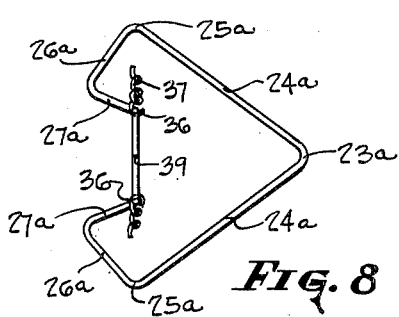
Fig. 8 is a plan view of the structure shown in Figs. 6 and 7.

In Figs. 6, 7 and 8 there is illustrated a modified construction wherein the base is the same as described above, but the legs 27a have secured to their upper ends, as at 35, the terminal portions 36 of an extension coil spring 37 whose intermediate portion 38 is adapted to embrace the funnel 11 at the groove 29. Preferably, one of the spring terminal portions 36 would be permanently connected to the upper end of a leg 27a, while the other terminal portion would be detachable from the other leg, as by a hook connection. Preferably, the two legs 27a are joined at their upper ends, by soldering, as at 39, to form an endless member.

A further advantage of both of the constructions shown lies in the fact that if any drops of liquid tend to collect in the funnel while supported, they will drain to the lower part of the bowl 18, and for this reason it may be found desirable to provide legs 27 or 27a of such length that the stem 19 inclines down slightly towards the bowl when supported.

While the invention has been shown in several forms, it will be apparent that it is not so limited, but is susceptible of various changes and modifications without departing from the spirit thereof.

What is claimed is:

Supporting structure for a coffee brewing funnel which has a bowl and a stem extending therefrom and surrounded by a gasket, said structure comprising a length of wire having a bend at its mid portion providing diverging first portions joined at one end by said bend, said diverging first portions being joined by a pair of bends to converging second portions, said first and second portions and said bends lying in a common plane and constituting a base adapted to rest on any substantially horizontal supporting surface, a pair of legs joined to the free ends of said second portions and extending upwardly therefrom in a common plane, and securing means carried by the upper ends of said arms and adapted to engage the supported funnel at the joint between its bowl and gasket when said funnel is disposed horizontally with the side of its bowl resting on and supported solely by said base, said securing means comprising a pair of fingers constituting extensions of said arms and including bent portions providing opposed gripping members adapted to releasably grip opposite sides of the funnel, and resilient means secured between said arms for urging said gripping members into engagement with the opposite sides of the funnel.

GEORGE F. CALDWELL.

REFERENCES CITED

The following references are of record in the file of this patent:

UNITED STATES PATENTS

| Number | Name | Date |
|---|---|---|
| 1,988,827 | Bennett | Jan. 22, 1935 |
| 2,092,526 | Aprile | Sept. 7, 1937 |